Feb. 3, 1925.

W. C. POLCHOW

CULTIVATOR

Filed July 25, 1923

1,524,839

2 Sheets-Sheet 1

W. C. Polchow,
INVENTOR

BY Victor J. Evans
ATTORNEY

WITNESS

Feb. 3, 1925. 1,524,839
W. C. POLCHOW
CULTIVATOR
Filed July 25, 1923   2 Sheets-Sheet 2

W.C.Polchow.
INVENTOR

BY Victor J. Evans.
ATTORNEY

WITNESS:

Patented Feb. 3, 1925.

1,524,839

UNITED STATES PATENT OFFICE.

WILLIAM C. POLCHOW, OF NEW ENGLAND, NORTH DAKOTA.

CULTIVATOR.

Application filed July 25, 1923. Serial No. 653,752.

*To all whom it may concern:*

Be it known that I, WILLIAM C. POLCHOW, a citizen of the United States, residing at New England, in the county of Hettinger and State of North Dakota, have invented new and useful Improvements in Cultivators, of which the following is a specification.

This invention relates to improvements in cultivators, the general object of the invention being to provide the frame of the cultivator with front and rear wheels so that it can be pulled with the minimum amount of power and also to so arrange the parts that it can be handled and steered very easily.

Another object of the invention is to provide means for steering the device through foot pedals and to raise and lower the gangs by means of hand levers.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
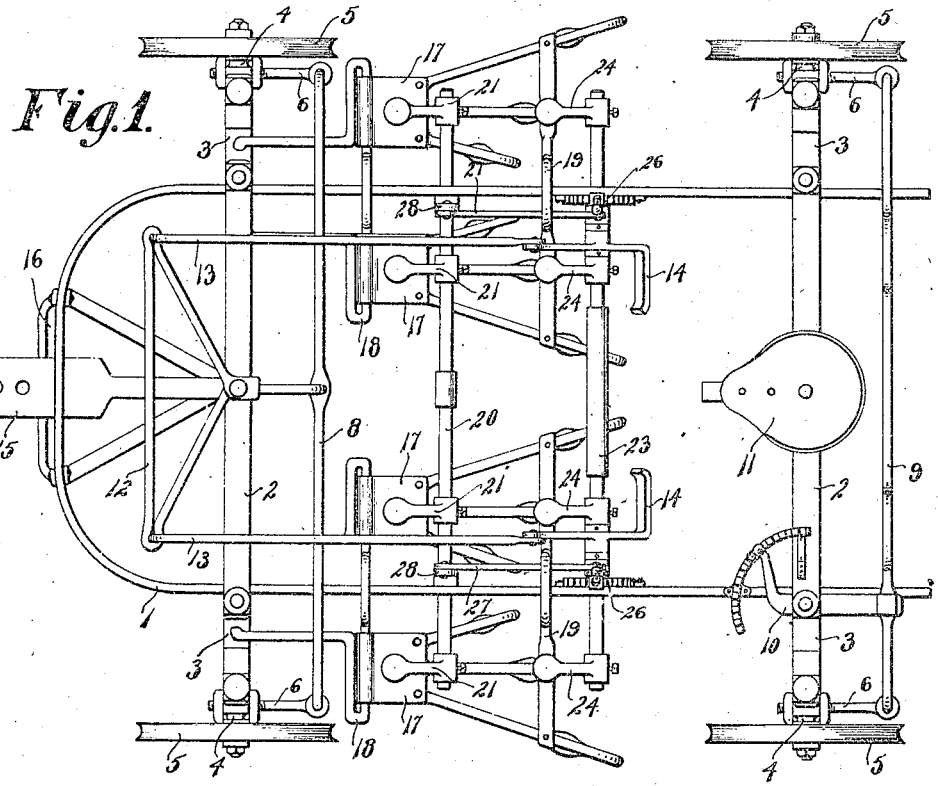
Figure 2:
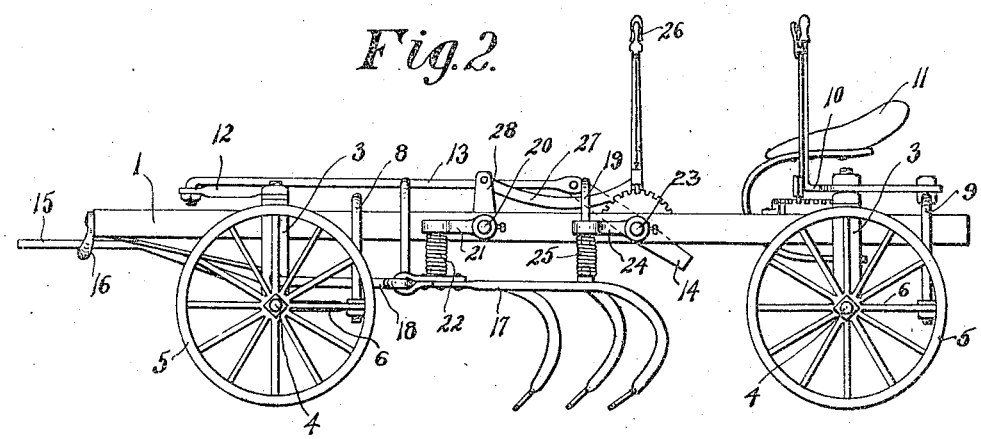
Figure 3:
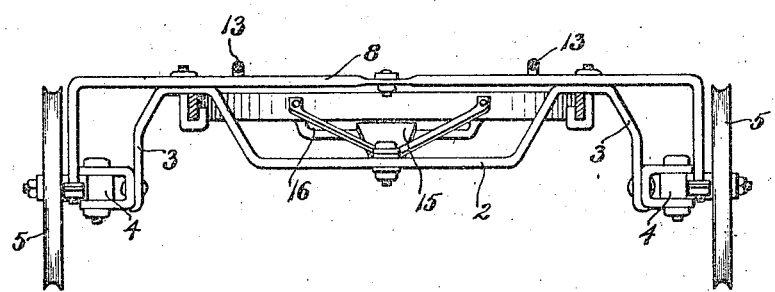
Figure 4:
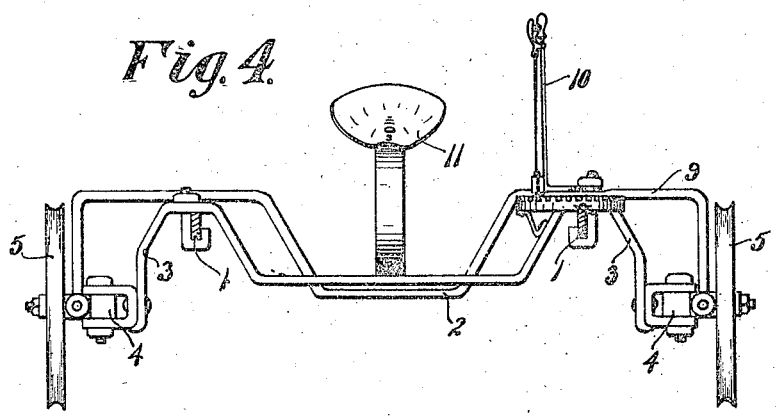
Figure 5:
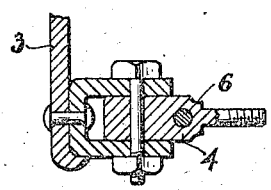

Figure 1 is a plan view of the device.
Figure 2 is a side view.
Figure 3 is a front view.
Figure 4 is a rear view.
Figure 5 is a sectional view showing the manner of connecting the spindle with the frame.

In these views 1 indicates a frame of the device which includes the axle members 2 which have depending parts 3 to which the spindles 4 are pivoted, these spindles carrying the wheels 5. Each spindle is provided with an arm 6 and the arms of the front spindles are connected together by the connecting rod 8 while the rear spindles are connected together by the connecting rod 9. A lever 10 is connected with the rear rod 9 and this lever is so located that it can be easily manipulated by a person sitting in the seat 11 so as to shift the rear wheels as desired. A yoke-shaped frame 12 is pivoted to the front of the main frame and its rear end is pivoted to the connecting rod 8. Rods 13 connect the yoke frame with the foot pedals 14 which are arranged adjacent the driver's seat so that the front wheels can be adjusted by manipulating the pedals with the feet. The draw bar 15 is pivoted to the main frame and passes through a slot 16 in the front end of the main frame so that the draw bar will have side play to make turning of the device easy. The gangs 17 are fastened to the beams 18 which have their forwardly extending ends connected with the axle part 2 at the front of the main frame, the connection being such that the beams can be raised and lowered. Each pair of gangs are connected together at the rear by the bar 19. A shaft 20 is rotatably mounted in the frame and consists of two sections, each of which is provided with a socketed arm 21 which is connected with the front end of a gang by the spring 22. Where the gangs are arranged in pairs two of such arms are placed on a section. A second sectional shaft 23 is journaled in the frame and each section of this shaft 23 carries a pair of socketed arms 24 which are connected by the springs 25 with the gangs. Each section of this latter shaft is adapted to be actuated by a hand lever 26 and each section of this shaft is connected with the section of the shaft 20 by means of the link 27 which connects the lever 26 with an arm 28 on the section of the shaft 20. Thus by manipulating the lever 26 the gangs can be raised and lowered and one pair of gangs can be regulated independently of the other pair. It will of course be understood that the cultivator can be constructed with any number of gangs to make it cultivate one, two or three rows. The machine shown in the drawing will cultivate two rows as the gangs are arranged in pairs, one pair for each row. The gangs may be provided with any desired number of shovels and the shovels may be of any suitable type. By providing the frame with four wheels makes the device of very light draft and by pivoting the spindles to the frame permits the device to be easily turned at the ends of the rows. By arranging the wheels and their connecting means as shown the rear wheels will hold the front wheels in their adjusted position and by providing pedals for steering the device the operator has both hands free to drive the horses and to actuate the lever. The device can be handled and steered so easily that any child old enough to drive a team can operate it.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A wheeled frame including front and rear axle parts, a spindle pivoted to each end of each axle part, a wheel carried by each spindle, a rod connecting the front pair of spindles together, a rod connecting the rear pair of spindles together, a yoke member pivoted to the frame and to the front rod, a pair of foot pedals, rods connecting the same with the yoke member and a hand lever for actuating the rod which connects the rear pair of spindles together.

2. A wheeled frame including front and rear axle parts, each part having depending ends, a spindle pivoted to each end, a front rod connecting the front pair of spindles together, a foot lever, means for connecting the same with the front rod to shift the same to move the front spindles, a rear rod connecting the rear pair of spindles together, a hand lever connected with said rod and wheels carried by the spindles.

In testimony whereof I affix my signature.

WILLIAM C. POLCHOW.